(No Model.)
C. DINSMOOR.
VEHICLE.
No. 351,749. Patented Nov. 2, 1886.
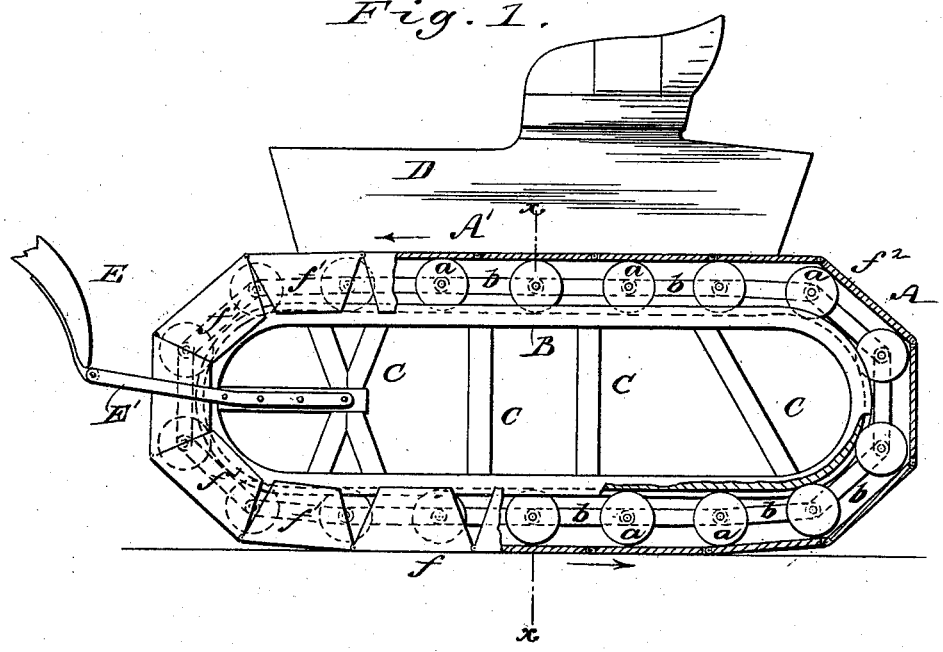
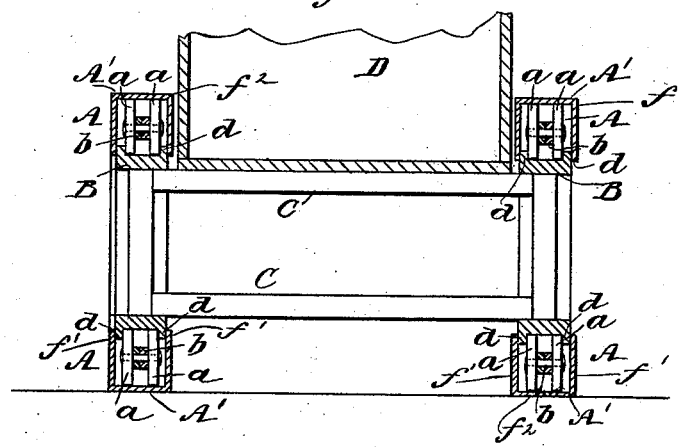
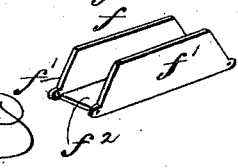
WITNESSES:
INVENTOR:
C. Dinsmoor
BY Munn & Co
ATTORNEYS.

UNITED STATES PATENT OFFICE.

CHARLES DINSMOOR, OF WARREN, PENNSYLVANIA.

VEHICLE.

SPECIFICATION forming part of Letters Patent No. 351,749, dated November 2, 1886.

Application filed February 17, 1886. Serial No. 192,214. (No model.)

*To all whom it may concern:*

Be it known that I, CHARLES DINSMOOR, of Warren, in the county of Warren and State of Pennsylvania, have invented a new and Improved Vehicle, of which the following is a full, clear, and exact description.

This invention relates to the running-gear of those classes of vehicles that run on wheels and axles or rollers, as distinguished from sleighs.

The object of my invention is to obviate as far as possible the jolt, strain, friction, and the difficulty of propulsion that are inherent in the class of vehicles having for their running-gear wheels and axles, to dispense with the use of springs, and to obtain a smooth and easy movement of the vehicle.

The invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a sectional side elevation of my new and improved vehicle. Fig. 2 is a transverse sectional elevation of the same on the line $x\,x$, Fig. 1. Fig. 3 is a perspective view of one of the guard-links.

A A represent the endless tracks, composed, principally, of the anti-friction rollers $a\,a$, linked together by the jointed connecting-links $b\,b$, thus forming endless chains of rollers.

B B represent the side pieces of the body of the vehicle. These are oblong in form, and are held parallel with each other by suitable frame-work, C C, which also supports the body D between the said side pieces B B. The edges or surfaces of the side pieces B B are flanged, as shown at $d\,d$, which flanges form guides for the wheels of the endless tracks A A to run in, thus obviating all danger of lateral displacement of the endless tracks.

A' A' represent the guards surrounding the anti-friction wheels $a\,a$. These guards are made up of links $f$, preferably of sheet metal, formed as shown in Fig. 3, each link having side flanges $f'$ and a bottom plate, $f^2$, the links being hinged together to form a continuous chain to inclose the anti-friction wheels $a\,a$, as shown clearly in Figs. 1 and 2. The ends of the flanges $f'\,f'$ are beveled to prevent the links from binding one with another as they pass around the ends of the side pieces, B B. The side flanges $f'\,f'$ are of such width relatively to the diameters of the anti-friction wheels $a\,a$ and the width of the side flanges $d\,d$ that the edges of the side flanges $f'$ receive the flanges $d$ between them, as shown clearly in Fig. 2, so that there is no danger of lateral displacement of the guards A'.

E represents thills or a pole attached to the vehicle by a strap, E', and by which the vehicle may be drawn.

As the vehicle is drawn along the ground the contact of the endless guards A' with the ground will cause the body of the vehicle to be drawn along the endless tracks, as it were, upon the oblong side pieces, B, the latter running upon the rollers $a\,a$. The endless tracks at the same time pass around the side pieces, B, over which they run with but little friction, so the vehicle will not only be easy-running, but, owing to the broad surface in contact with the ground, it will be very easy-riding.

Having thus fully described my invention, I claim as new and desire to secure by Letters Patent—

1. An improved vehicle consisting of the oblong frame B C, having guideways in its side pieces, a series of wheels, $a$, connected together by links $b$, guards A', hinged together to form a continuous chain, the body A, supported upon the frame between the endless track, and the tongue or thills E, connected to the said frame, substantially as herein shown and described.

2. In a vehicle, the combination, with the frame B C and a series of wheels, $a$, journaled in the connecting-links $b$, of a track consisting of a series of hinged links, $f$, each having beveled side flanges $f'$ and a bottom plate, $f^2$, the said track inclosing the said wheels and moving the same by frictional contact, substantially as herein shown and described.

CHARLES DINSMOOR.

Witnesses:
W. V. N. YATES,
S. P. JOHNSON.